US012299250B2

(12) United States Patent
Inoue

(10) Patent No.: US 12,299,250 B2
(45) Date of Patent: May 13, 2025

(54) SERVER APPARATUS, TERMINAL APPARATUS, INFORMATION PROCESSING SYSTEM, AND INFORMATION PROCESSING METHOD

(71) Applicant: SONY GROUP CORPORATION, Tokyo (JP)

(72) Inventor: Masayuki Inoue, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 351 days.

(21) Appl. No.: 17/915,759

(22) PCT Filed: Apr. 19, 2021

(86) PCT No.: PCT/JP2021/015892
§ 371 (c)(1),
(2) Date: Sep. 29, 2022

(87) PCT Pub. No.: WO2021/220866
PCT Pub. Date: Nov. 4, 2021

(65) Prior Publication Data
US 2023/0205389 A1 Jun. 29, 2023

(30) Foreign Application Priority Data
May 1, 2020 (JP) ................. 2020-081563

(51) Int. Cl.
G06T 19/00 (2011.01)
A63F 13/40 (2014.01)
G06F 3/01 (2006.01)
G06F 3/04815 (2022.01)

(52) U.S. Cl.
CPC .......... *G06F 3/04815* (2013.01); *A63F 13/40* (2014.09); *G06F 3/011* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 11,627,118 | B1* | 4/2023 | Terrano | H04N 23/66 713/150 |
| 2013/0293671 | A1* | 11/2013 | Gorstan | G06T 3/4038 348/36 |
| 2019/0065855 | A1* | 2/2019 | Lerman | G06V 20/20 |

FOREIGN PATENT DOCUMENTS

| | | |
|---|---|---|
| JP | 2015-089507 A | 5/2015 |
| JP | 2016-027480 A | 2/2016 |
| JP | 2018-094326 A | 6/2018 |
| WO | WO 2019/064872 A1 | 4/2019 |
| WO | WO 2019/067112 A1 | 4/2019 |

* cited by examiner

Primary Examiner — Yanna Wu
(74) Attorney, Agent, or Firm — Paratus Law Group, PLLC

(57) ABSTRACT

There is provided a technology capable of reducing the processing load on a server apparatus in cloud rendering. The server apparatus according to the present technology includes a control unit. The control unit groups, on the basis of position information of terminal apparatuses capable of performing augmented reality (AR) display, terminal apparatuses that are present within a predetermined region and generates and sends a common AR image to the terminal apparatuses included in a group.

14 Claims, 12 Drawing Sheets

SERVER APPARATUS, TERMINAL APPARATUS, INFORMATION PROCESSING SYSTEM, AND INFORMATION PROCESSING METHOD

CROSS REFERENCE TO PRIOR APPLICATION

This application is a National Stage Patent Application of PCT International Patent Application No. PCT/JP2021/015892 (filed on Apr. 19, 2021) under 35 U.S.C. § 371, which claims priority to Japanese Patent Application No. 2020-081563 (filed on May 1, 2020), which are all hereby incorporated by reference in their entirety.

TECHNICAL FIELD

The present technology relates to a technology such as a server apparatus that performs cloud rendering.

BACKGROUND ART

In recent years, a service called cloud gaming is becoming widely known. In the cloud gaming, a server apparatus in a cloud generates moving images necessary for game progress and sends the moving images to each terminal apparatus. Therefore, intricate real game experience can be provided to users even with terminal apparatuses having relatively low processing capability, such as smartphones.

In a case of the cloud gaming, the server apparatus has a problem in that the processing load on the server apparatus is heavy because the server apparatus needs to generate individual moving images for each terminal apparatus.

Patent Literature 1 below has disclosed a technology of reducing the processing load on a server apparatus by generating not moving images but drawing commands in text format for each terminal apparatus and sending the drawing commands to each terminal apparatus in cloud gaming.

CITATION LIST

Patent Literature

Patent Literature 1: Japanese Patent Application Laid-open No. 2015-89507

DISCLOSURE OF INVENTION

Technical Problem

In the technology described in Patent Literature 1, the processing load on the server apparatus is not greatly reduced, and it is insufficient.

In view of the above-mentioned circumstances, it is an object of the present technology to provide a technology capable of reducing the processing load on a server apparatus in cloud rendering.

Solution to Problem

A server apparatus according to the present technology includes a control unit. The control unit groups, on the basis of position information of terminal apparatuses capable of performing augmented reality (AR) display, terminal apparatuses that are present within a predetermined region and generates and sends a common AR image to the terminal apparatuses included in a group.

In this server apparatus, it is sufficient to generate an AR image for each predetermined region (for each group), and therefore the processing load on the server apparatus in the cloud rendering can be appropriately reduced.

A terminal apparatus according to the present technology includes a control unit. The control unit receives, from a server apparatus that groups, on the basis of position information of terminal apparatuses capable of performing augmented reality (AR) display, terminal apparatuses that are present within a predetermined region and generates and sends a common AR image to the terminal apparatuses included in a group, the common AR image and performs AR display on the basis of the common AR image.

An information processing system according to the present technology includes a server apparatus and a terminal apparatus.

The server apparatus groups, on the basis of position information of terminal apparatuses capable of performing augmented reality (AR) display, terminal apparatuses that are present within a predetermined region and generates and sends a common AR image to the terminal apparatuses included in a group.

The terminal apparatus receives the common AR image and performs AR display on the basis of the common AR image.

An information processing method according to the present technology includes grouping terminal apparatuses that are present within a predetermined region on the basis of position information of the terminal apparatuses capable of performing augmented reality (AR) display and generating and sending a common AR image to the terminal apparatuses included in a group.

MODE(S) FOR CARRYING OUT THE INVENTION

Hereinafter, embodiments according to the present technology will be described with reference to the drawings.

First Embodiment

Overview of Information Processing System 100

Figure 1:
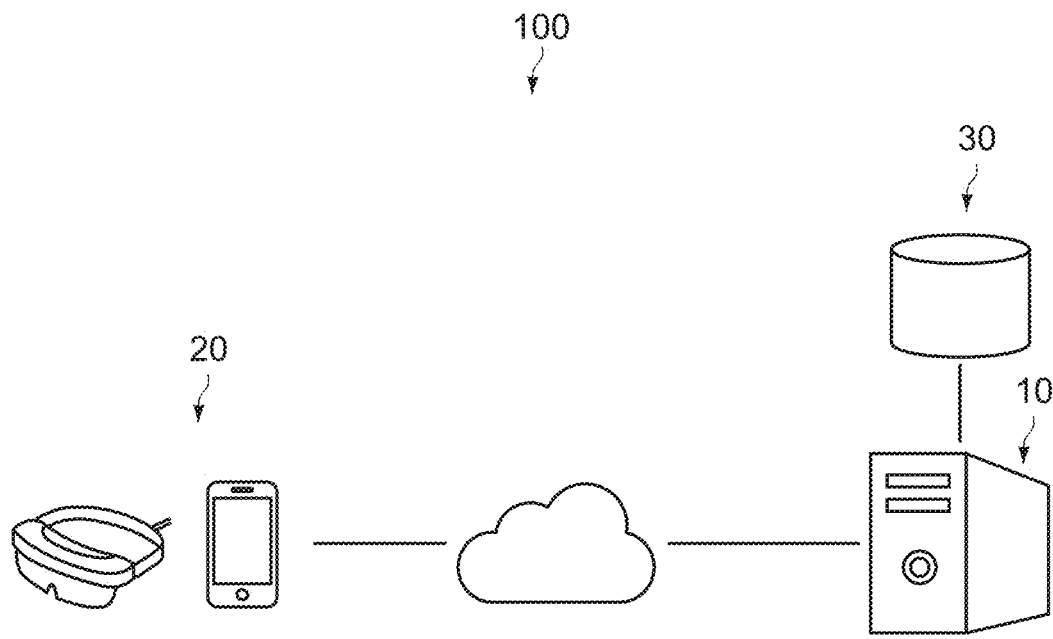
FIG. 1 A diagram showing an information processing system according to a first embodiment of the present technology.

FIG. 1 is a diagram showing an information processing system 100 according to a first embodiment of the present technology. As shown in FIG. 1, the information processing system 100 includes a server apparatus 10, a plurality of terminal apparatuses 20, and a shielding object database 30.

The information processing system 100 according to the first embodiment of the present technology is a system used for a cloud gaming service associated with a multiplay augmented reality (AR) game. In the present embodiment, a user can enjoy the multiplay AR game by moving in the real space while the user wears or carries the terminal apparatus 20.

Moreover, in the present embodiment, the server apparatus 10 in a cloud generates an AR image (cloud rendering) and sends the AR image to each terminal apparatus 20 and each terminal apparatus 20 AR displays the AR image received from the server apparatus 10. In this manner, in the present embodiment, high-quality AR images (e.g., three-dimensional computer graphics (CG) images) that cannot be realized with the processing capability of the terminal apparatus 20 can be AR displayed at each terminal apparatus 20.

On the other hand, in a case where the server apparatus 10 individually generates an AR image for each terminal apparatus 20, the processing load on the server apparatus 10 increases in proportion to the number of terminal apparatuses 20 (number of users) that join a game. Therefore, in the present embodiment, the server apparatus 10 performs processing of grouping the terminal apparatuses 20 that are present in a predetermined region in the real space on the basis of respective position information of the respective terminal apparatuses 20 and generating and sending a common AR image to the terminal apparatuses 20 included in the group.

In the shielding object database 30, position information and shape information of shielding objects 6 in the real space are stored as a database. The shielding objects 6 are, for example, the buildings, walls, and the like in the real space. How to use the position information and shape information of the shielding objects 6 will be described later in detail with reference to FIGS. 13 to 15 and the like.

Configurations of Respective Parts of Information Processing System 100

Server Apparatus 10

Figure 2:
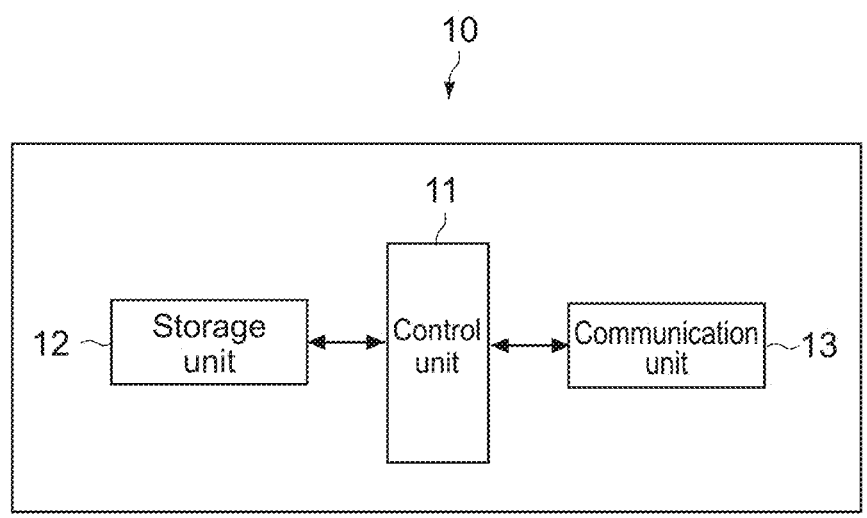
FIG. 2 A block diagram showing an internal configuration of a server apparatus.

FIG. 2 is a block diagram showing an internal configuration of the server apparatus 10. As shown in FIG. 2, the server apparatus 10 includes a control unit 11, a storage unit 12, and a communication unit 13.

The control unit 11 performs various arithmetic operations on the basis of various programs stored in the storage unit 12 and comprehensively controls the respective parts of the server apparatus 10. It should be noted that processing of the control unit 11 of the server apparatus 10 will be described later in detail in the section of the operation description.

The control unit 11 is realized by hardware or a combination of hardware and software. The hardware is configured as a part of the control unit 11 or the entire control unit 11 and this hardware can be a central processing unit (CPU), a graphics processing unit (GPU), a digital signal processor (DSP), a field programmable gate array (FPGA), an application specific integrated circuit (ASIC), or a combination of two or more of them. The same applies to the control unit 11 in the terminal apparatus 20.

The storage unit 12 includes various programs necessary for processing of the control unit 11, a nonvolatile memory in which various types of data are stored, and a volatile memory that is used for a working area of the control unit 11. It should be noted that the various programs may be read from a portable recording medium such as an optical disc and a semiconductor memory or may be downloaded from another server apparatus in a network.

The communication unit 13 is configured to be capable of communication with the respective terminal apparatuses 20 via the network.

Terminal Apparatus 20

The terminal apparatus 20 may be, for example, a wearable device attachable to the user's body or may be a mobile device portable to the user.

The wearable device can be, for example, a head mounted display (HMD) wearable device, a wristband-type wearable device, a watch-type wearable device, a ring-type wearable device, or a pendant-type wearable device. The mobile device can be, for example, a mobile phone (including a smartphone), a tablet personal computer (PC), a portable game console, or a portable music player.

Typically, the terminal apparatus 20 can be any apparatus as long as the apparatus can satisfy four conditions that (1) it is capable of AR display, (2) capable of estimating self-position and attitude in the real space, (3) capable of communicating with the server apparatus 10, and (4) movable along with the user's movement.

Figure 3:
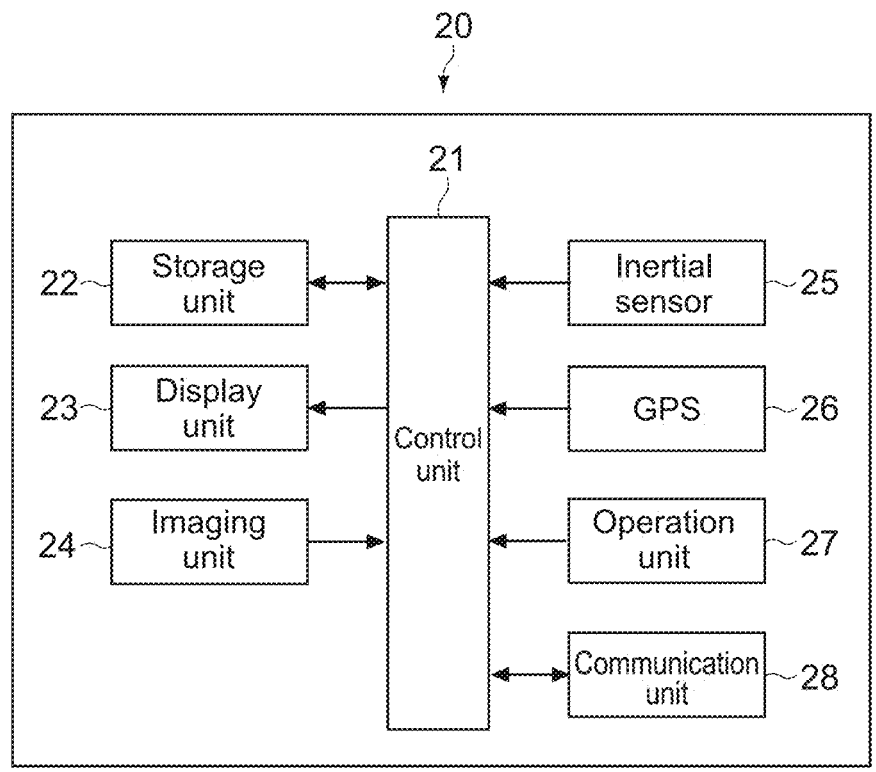
FIG. 3 A block diagram showing an internal configuration of a terminal apparatus.

FIG. 3 is a block diagram showing an internal configuration of the terminal apparatus 20. As shown in FIG. 3, the terminal apparatus 20 includes a control unit 21, a storage unit 22, a display unit 23, an imaging unit 24, an inertial sensor 25, a global positioning system (GPS) 26, an operation unit 27, and a communication unit 28.

The control unit 21 performs various arithmetic operations on the basis of the various programs stored in the storage unit 22 and comprehensively controls the respective parts of the terminal apparatus 20. It should be noted that processing of the control unit 21 of the terminal apparatus 20 will be described later in detail in the section of the operation description.

The storage unit 22 includes various programs necessary for processing of the control unit 21, a nonvolatile memory in which various types of data are stored, and a volatile memory that is used for a working area of the control unit 21. It should be noted that the various programs may be read from a portable recording medium such as an optical disc and a semiconductor memory or may be downloaded from a server apparatus in a network.

The display unit 23 AR displays a virtual object under the control of the control unit 21. The display unit 23 may be a see-through display unit or may be a video see-through display unit. In a case of the see-through display unit (e.g., HMD), a virtual object is AR displayed on a transparent display unit positioned at the end of the user's line of sight. In a case of the video see-through display unit, the AR display is performed in such a manner that an image in which a virtual object is superimposed on an image currently imaged by the imaging unit 24 is displayed on the display unit 23.

The imaging unit 24 is, for example, a camera and includes an imaging element such as a charge coupled device (CCD) sensor and a complemented metal oxide semiconductor (CMOS) sensor and an optical system such as an imaging lens. The imaging unit 24 acquires image information around the terminal apparatus 20 in the real space and outputs the obtained image information to the control unit 21.

The inertial sensor 25 includes acceleration sensors that detect acceleration in the three axis directions and angular velocity sensors that detect angular velocity about the three axes. The inertial sensor 25 outputs the acceleration in the three axis directions and the angular velocity about the three axes, which have been obtained in the detection, to the control unit 21 as inertial information.

Although in the present embodiment, the detection axis of the inertial sensor 25 are set to be three axes, the detection axis may be a single axis or two axes. Moreover, although in the present embodiment, two kinds of sensors are used as the inertial sensor 25, one kind of sensor or three or more kinds of sensors may be used as the inertial sensor 25. It should be noted that other examples of the inertial sensor 25 can include a speed sensor and an angle sensor.

The GPS 26 receives signals from a GPS satellite and estimate a self-position in a global coordinate system.

The operation unit 27 is, for example, various operation units such as a press-type and a proximity-type, and detects the user's operation and outputs the user's operation to the control unit 21. The operation unit 27 has a function as a game controller capable of detecting the user's game command operation. It should be noted that the game controller (operation unit 27) may be provided in the terminal apparatus 20 itself or may be provided separated from the terminal apparatus 20.

The communication unit 28 is configured to be capable of communication with the server apparatus 10 via the network.

Operation Description

Figure 4:
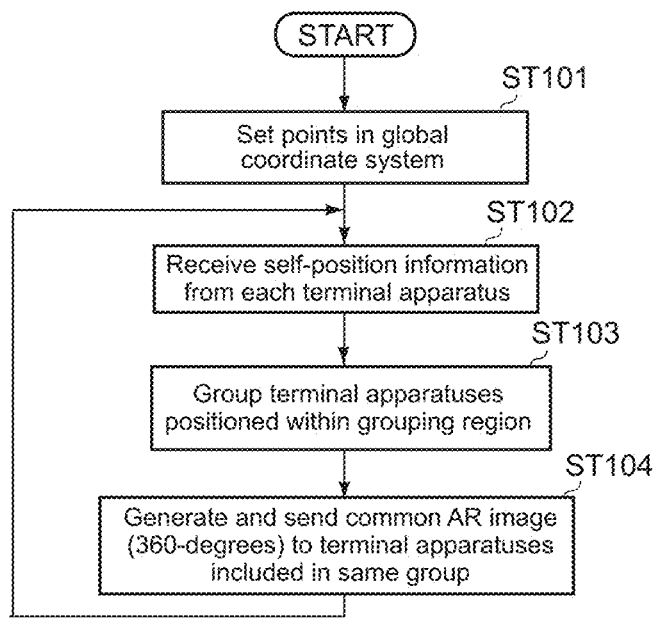
FIG. 4 A flowchart showing processing of the server apparatus.
Figure 5:
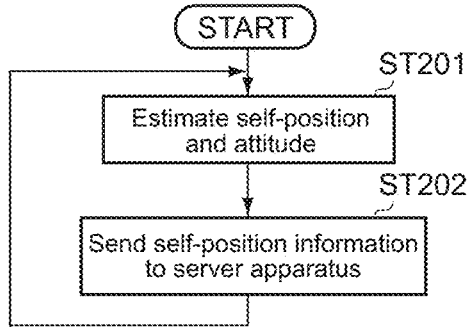
FIG. 5 A flowchart showing processing of the terminal apparatus.
Figure 6:
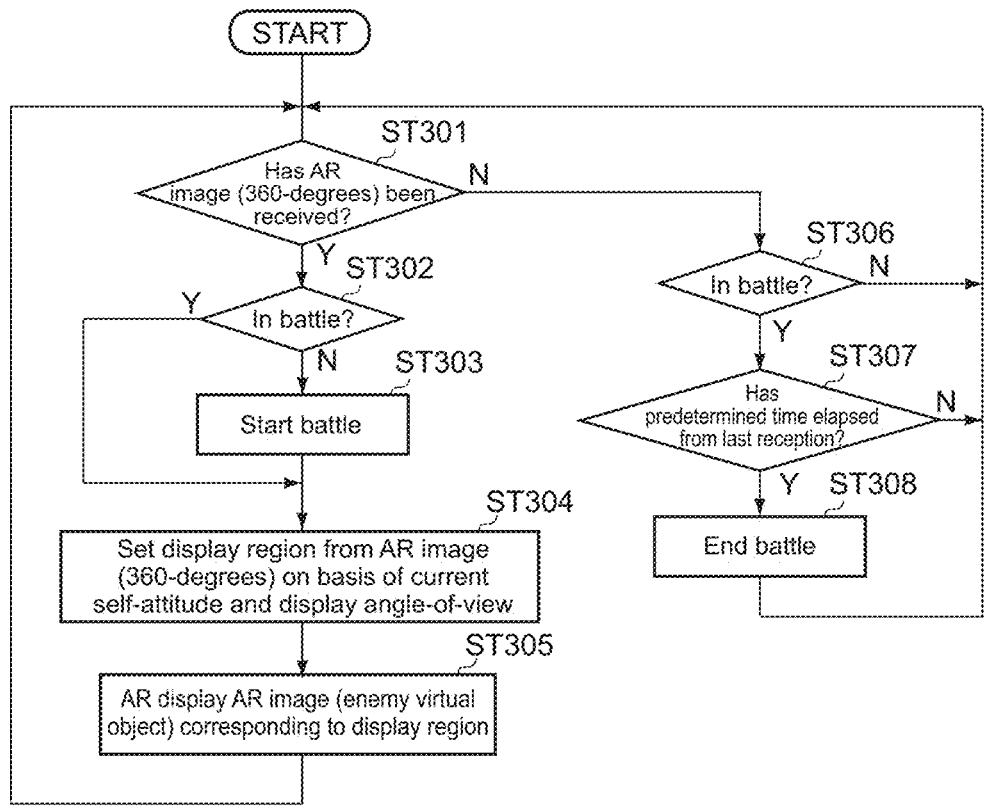
FIG. 6 A flowchart showing processing of the terminal apparatus.

Next, processing of the information processing system 100 will be described. FIG. 4 is a flowchart showing processing of the server apparatus 10. FIGS. 5 and 6 are flowcharts showing the processing of the terminal apparatus 20.

Localization Processing of Terminal Apparatus 20

First of all, the localization processing of the terminal apparatus 20 will be described with reference to FIG. 5. In a predetermined cycle, the control unit 21 of each terminal apparatus 20 repeatedly performs processing of estimating self-position and attitude (Step 201) and outputting the estimated self-position information to the server apparatus 10 (Step 202).

In Step 201, the control unit 21 of the terminal apparatus 20 performs estimation of self-position and attitude (hereinafter, simply referred to as localization) on the basis of image information obtained by the imaging unit 24, inertial information obtained from the inertial sensor 25, and GPS information obtained by the GPS 26, for example.

In the localization, the localization of the terminal apparatus 20 is performed by, for example, comparing a group of feature points extracted from the image information acquired by the imaging unit 24 with a group of feature points included in map information.

For the map information that is used for the localization, there are a method of previously creating it and a method of creating it at the same time as the localization without previously creating it, and either one of the methods may be used. It should be noted that the method of creating the map information as the same time of the localization is generally called simultaneous localization and mapping (SLAM).

The localization includes relocalization and motion tracking. The relocalization is a technology of performing the localization in the global coordinate system on the basis of the group of feature points of the image information and the group of feature points of the map information.

The relocalization is performed, for example, immediately after the terminal apparatus 20 is powered on or in a case where localization based on motion tracking fails. Alternatively, the processing of comparing the group of feature points from the image information with the group of feature points included in the map information may be constantly performed and the relocalization may be performed in a case where matching between these groups of feature points is successful.

The motion tracking is a technology of calculating an amount of change (motion) of the self-position and attitude for each minute time on the basis of the image information (or the inertial information) and adding this amount of change as necessary, to thereby estimate the current self-position in the global coordinate system.

In the motion tracking, first of all, the image information acquired by the imaging unit 24 is subjected to image processing and a group of feature points is extracted from the image information. Then, by comparing the group of feature points of the previous image information with the group of feature points of the current image information, an amount of change between the previous self-position and attitude and the current self-position and attitude is calculated. By adding this amount of change to the previous self-position and attitude, the current self-position in the global coordinate system is estimated.

In the description here, the image information from the imaging unit 24 is used for the motion tracking has been described, but the inertial information from the inertial sensor 25 may be used instead of the image information. Alternatively, the image information and the inertial information may be both used.

Alternatively, in the localization, the GPS information obtained by the GPS 26 may be used.

It should be noted that various methods have been proposed for the localization technology at the present, and typically, the terminal apparatus 20 may perform the localization processing by any method.

Processing of Server Apparatus 10

Figure 7:
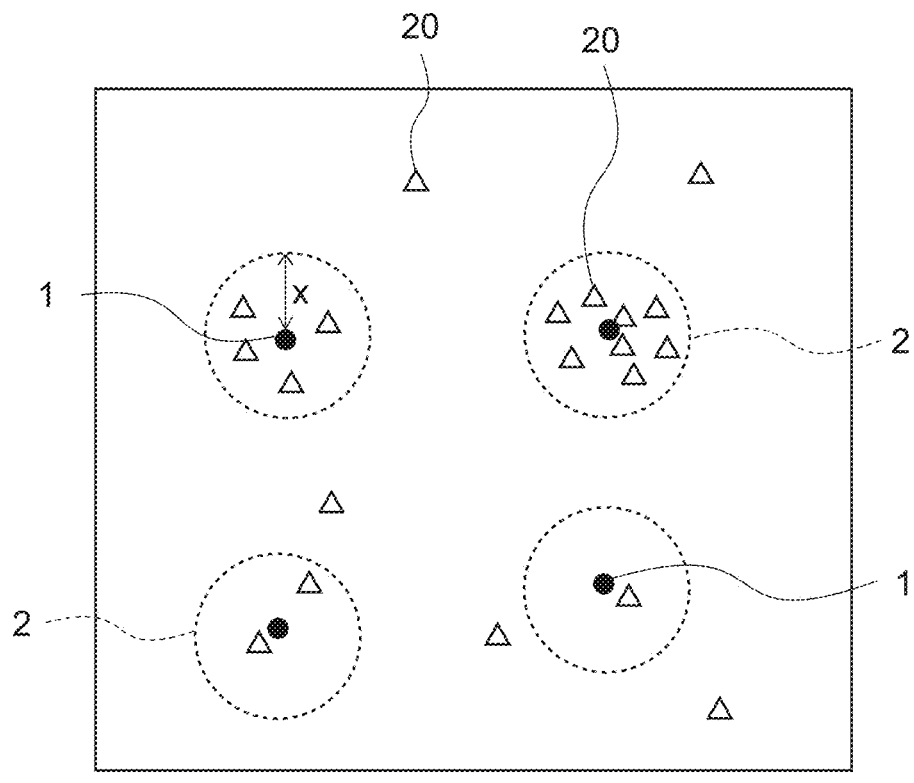
FIG. 7 A diagram showing a state when points are set in a global coordinate system.

Next, the processing of the control unit 11 of the server apparatus 10 will be described with reference to FIG. 4. First of all, the control unit 11 of the server apparatus 10 sets points 1 in the global coordinate system in accordance with input from a game production side (Step 101). FIG. 7 is a diagram showing a state when the points 1 are set in the global coordinate system.

As shown in FIG. 7, in the present embodiment, the game production side sets an arbitrary number of points 1 at arbitrary positions in the global coordinate system in accordance with the game contents. The point 1 is a point that is the center of a predetermined region 2 on which the terminal apparatus 20 is grouped. It should be noted that in the description below, the predetermined region including the point 1, which is the region on which the terminal apparatus 20 is grouped, will be referred to as a grouping region 2 for the sake of convenience.

In the example shown in FIG. 7, an example in a case where the number of points 1 and the number of grouping regions 2 are four is shown. On the other hand, it is sufficient that the number of points 1 and the number of grouping regions 2 are one or more, and this number is not particularly limited.

Moreover, although in the example shown in FIG. 7, an example in a case where the shape of the grouping region 2 is circular is shown, the shape of the grouping region 2 may be an oval shape, a polygonal shape (triangular shape, rectangular shape, etc.), a star shape, or the like, and this shape is not particularly limited. It should be noted that in the present embodiment, a region within a predetermined distance (first distance) x from the point 1 is the grouping region 2.

Moreover, in the present embodiment, the grouping region 2 corresponds to a play area, and when the terminal apparatus 20 (user) is present in this play area, the terminal apparatus 20 is enabled to play the game. It should be noted that the play area does not need to be completely identical to the grouping region 2, and for example, the play area may be set to be wider or narrower than the grouping region 2.

When the control unit 11 of the server apparatus 10 sets the points 1 and the grouping region 2 in the global coordinate system, then the control unit 11 of the server apparatus 10 receives the self-position information from each terminal apparatus 20 (Step 102). Next, the server apparatus 10 groups the terminal apparatuses 20 positioned within the grouping region 2 (Step 103).

For example, in the example shown in FIG. 7, four terminal apparatuses 20 are present within the upper left grouping region 2, and therefore the four terminal apparatuses 20 are grouped as the same group. The grouping is performed in a similar way also for each of upper right, lower left, and lower right grouping regions 2.

It should be noted that as to the terminal apparatuses 20 not belonging to any grouping region 2, the grouping is not performed and AR images are not also sent from the server apparatus 10.

When the control unit 11 of the server apparatus 10 groups the terminal apparatuses 20 for each grouping region 2 (for each point 1), then the control unit 11 of the server apparatus 10 generates a common AR image for each of the terminal apparatuses 20 included in the same group and sends the common AR image to each terminal apparatus 20 (Step 104). Thereafter the control unit 11 of the server apparatus 10 repeatedly performs the processing of Steps 102 to 104.

As described above, in the present embodiment, it is unnecessary for the server apparatus 10 to individually generate AR images for each terminal apparatus 20, and it is sufficient to generate an AR image for each grouping region 2. Therefore, the processing load on the server apparatus 10 in the cloud rendering can be appropriately reduced.

Figure 8:
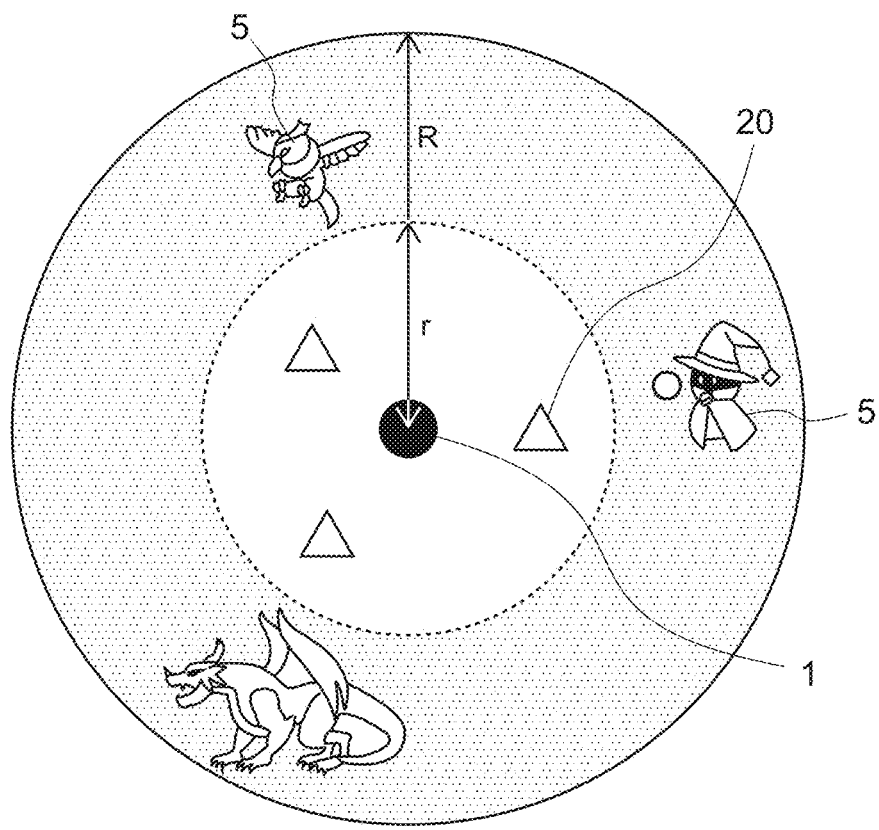
FIG. 8 A diagram showing an example of a common AR image.

FIG. 8 is a diagram showing an example of the common AR image. As shown in FIG. 8, in the present embodiment, the common AR image is a 360-degree AR image including enemy virtual objects 5. Moreover, as to a drawing region in the common AR image, the inner circumference is set at a distance (second distance) r from the point 1 and the outer circumference is set at a distance (third distance) R from the point 1. That is, for the common AR image, a region at the distance (second distance) r or more and the distance R (third distance) or less from the point 1 is the drawing region and virtual objects are arranged within this region.

In the present embodiment, the common AR image is a 360-degree image. Typically, it is sufficient that the common AR image is set to have an angle wider than a display angle of the display unit 23 in the terminal apparatus 20 (e.g., 270 degrees, 180 degrees, etc.).

Moreover, the distance r in the inner circumference is typically set to be equal to or longer than a distance x (r≥x) for grouping. Therefore, in the present embodiment, the drawing region for the enemy virtual objects 5 is set at a position outside the grouping region 2 (play area).

In the example shown in FIG. 8, a state when a virtual object of a bird monster is arranged at the northwest (upper left), a virtual object of a witch monster arranged at the east (right), and a virtual object of a dragon monster is arranged at the southwest (lower left) as examples of the enemy virtual objects 5 is shown.

Here, how the enemy virtual object 5 looks to the user through each terminal apparatus 20 when a common AR image is used in each of the terminal apparatuses 20 belonging to the same group will be described. In the example shown in FIG. 8, three terminal apparatuses 20 (three human users) belong to the same group and their positions in the real space are different.

On the other hand, AR images that are used in the three terminal apparatuses 20 are the common AR image. Therefore, in a case where the respective terminal apparatuses 20 face the same direction in the real space, it appears to each user that the enemy virtual object 5 faces the same direction at a position in the same direction and at the same distance from the user in an AR space. In other words, although the respective users are present at different positions in the real space, it appears to all the users as if they were watching the enemy virtual object 5 from the position of the point 1 in the AR space.

It will be described specifically, showing an example. It is assumed that in FIG. 8, all the terminal apparatuses 20 face the north (upper) side. Irrespective of the positions of the users (terminal apparatuses 20), all the users perceive the virtual object as if they were watching the enemy virtual object 5 from the position of the point 1, and the virtual object of the bird monster is currently arranged at the northwest (upper left) in the AR image. Therefore, in this case, irrespective of the positions of the users (terminal apparatuses 20), it appears to all the users that the enemy virtual object 5 faces the same direction at the position at the same distance from the other users in the diagonally forward left direction in the same way as the other users.

Here, the enemy virtual object 5 is an example of a first virtual object. In the present embodiment, the first virtual object is a virtual object included in the common AR image and also is a virtual object whose relative AR display position from each terminal apparatus 20 is the same for each of the positions of the respective terminal apparatuses 20. It should be noted that the first virtual object is not limited to the enemy virtual object 5 and any object can be employed as the first virtual object as long as the virtual object satisfies this condition.

Processing of Terminal Apparatus 20

Next, the processing of the terminal apparatus 20 will be described. Referring to FIG. 6, first of all, an AR image common to the group is sent from the server apparatus 10 to the control unit 21 of the terminal apparatus 20 and the control unit 21 of the terminal apparatus 20 determines whether the AR image has been received (Step 301). It should be noted that as described above, the common AR image is sent to the terminal apparatuses 20 positioned within the grouping region 2 from the server apparatus 10 (see Step 104).

In a case where the AR image to the user has been received (YES in Step 301), the control unit 21 of the terminal apparatus 20 determines whether the user is currently in battle with the enemy virtual object 5 (Step 302).

In a case where the AR image has been received but the control unit 21 of the terminal apparatus 20 is not in battle (NO in Step 302), i.e., in a case where the terminal apparatus 20 that had been positioned outside the grouping region 2 has entered the grouping region 2, the control unit 21 of the terminal apparatus 20 starts the battle with the enemy (Step 303). When the control unit 21 of the terminal apparatus 20 starts the battle, the control unit 21 of the terminal apparatus 20 may notify the user of the fact that the battle with the enemy is started by sound or image, for example.

When the control unit 21 of the terminal apparatus 20 starts the battle, the control unit 21 of the terminal apparatus 20 shifts to Step 304. Moreover, in Step 302, in a case where it is currently already in battle, the control unit 21 of the terminal apparatus 20 skips Step 303 and shifts to next Step 304.

In Step 304, the control unit 21 of the terminal apparatus 20 sets a display region from the 360-degree AR image on the basis of a current self-attitude and a display angle-of-view of the display unit 23. Next, the control unit 21 of the terminal apparatus 20 AR displays the AR image (enemy virtual objects 5) corresponding to the display region (Step 305).

It should be noted that as described above, although the respective users belonging to the same group are present at different positions in the real space at this time, it appears to all the users as if they were watching the enemy virtual object 5 from the position of the point 1.

In Step 301, in a case where the common AR image to the user has not been received (NO in Step 301), the control unit 21 of the terminal apparatus 20 determines whether the user is currently in battle with the enemy (Step 306).

In a case where the AR image to the user has not been received and the control unit 21 of the terminal apparatus 20 is not currently in battle with the enemy (NO in Step 306), i.e., in a case where the terminal apparatus 20 is continuously positioned outside the grouping region 2, the control unit 21 of the terminal apparatus 20 returns to Step 301.

On the other hand, in a case where the AR image to the user has not been received but the user is currently in battle with the enemy (YES in Step 306), i.e., in a case where the terminal apparatus 20 within the grouping region 2 has gotten out of the grouping region 2, the control unit 21 of the terminal apparatus 20 shifts to Step 307.

In Step 307, the control unit 21 of the terminal apparatus 20 determines whether a predetermined time (about several seconds) has elapsed from the last reception of the common AR image (Step 307). In a case where the predetermined time has not elapsed (NO in Step 307), the control unit 21 of the terminal apparatus 20 returns to Step 301.

On the other hand, in a case where the predetermined time has elapsed (YES in Step 307), the control unit 21 of the terminal apparatus 20 ends the battle with the enemy (Step 308) and returns to Step 301. When the battle is ended, the control unit 21 of the terminal apparatus 20 may notify the user of the fact that the battle with the enemy is ended by sound or image, for example.

Flying Object

Figure 9:
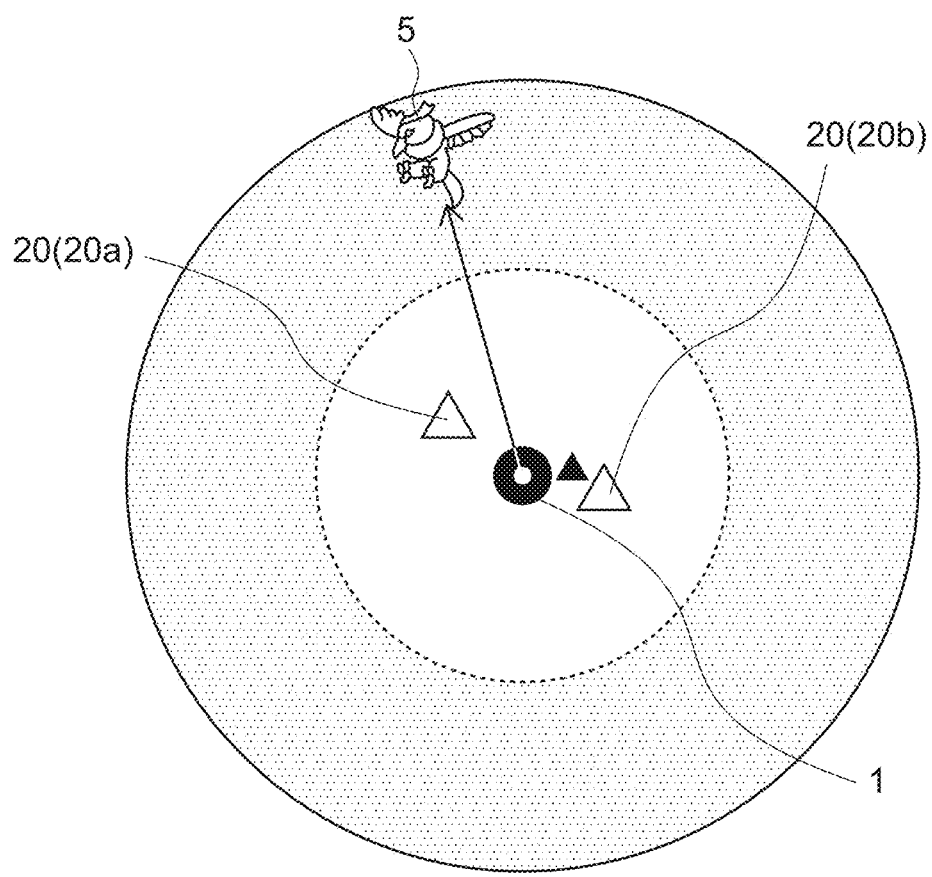
FIG. 9 A diagram for describing a flying object.
Figure 9:
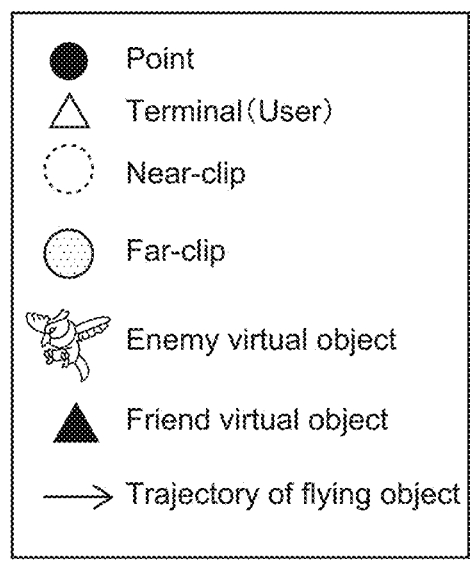

Next, a flying object (second virtual object) will be described. FIG. 9 is a diagram for describing the flying object.

The flying object is a virtual object AR displayed when the user attacks an enemy by a command, and for example, is a virtual object, such as magic, bullet, and arrow, which moves toward the enemy virtual object 5 from the user (terminal apparatus 20).

Here, in the description of FIG. 9, the user and the terminal apparatus 20 positioned at the northwest (upper left) of the point 1 will be respectively referred to as a first user and a first terminal apparatus 20a for the sake of convenience and the user and the terminal apparatus 20 positioned at the east (right) of the point 1 will be respectively referred to as a second user and a second terminal apparatus 20b for the sake of convenience. Moreover, a case where the flying object is the virtual object as the common AR image is assumed.

First of all, it is assumed that the first user has input a command through the first terminal apparatus 20a, and for example, has done a magic attack or the like to the enemy virtual object 5. In this case, the first user and the first terminal apparatus 20a are not positioned at the point 1 but the first user perceives the enemy virtual object 5 as if the first user was watching the enemy virtual object 5 from the position of the point 1. Then, in this case, for the first user, it is natural to AR display the flying object so that the flying object based on the magic attack or the like flies toward the enemy virtual object 5 from the self-position (i.e., the point 1).

The second user and the second terminal apparatus 20b are also not positioned at the point 1 but the second user perceives the enemy virtual object 5 as if the second user was watching the enemy virtual object 5 from the position of the point 1. On the other hand, the second user has not done a magic attack or the like when the first user has done the magic attack or the like. However, in a case where the flying object is the virtual object based on the common AR image, also for the second user, the flying object is AR displayed so that the flying object based on the magic attack or the like flies toward the enemy virtual object 5 from the self-position.

That is, in a case where the flying object is the virtual object based on the common AR image, it looks unnatural to the second user in some cases. Such a problem is ignorable in a single-play AR game, while the problem is not ignorable in a multiplay AR game. Therefore, in the present embodiment, as to the flying object, an AR image is individually generated by each terminal apparatus 20 and is superimposed on a common AR image generated by the server apparatus 10.

Here, the flying object is an example of the second virtual object. The second virtual object is a virtual object whose relative AR display position from each terminal apparatus 20 is different for each of the positions of the respective terminal apparatuses 20. The second virtual object is not limited to the flying object and can be any the virtual object as long as the second virtual object satisfies this condition.

For example, the second virtual object may be a virtual object of a friend character that is AR displayed near the user. For example, a case where a friend virtual object positioned on the right-hand side near the first user in FIG.

9 is present will be assumed. In this case, a friend monster positioned on the right-hand side as viewed from the first user should be positioned on the left-hand side as viewed from the second user, and it is unnatural that the friend monster is positioned on the right-hand side as viewed from the second user. Therefore, also as to such a friend virtual object, an AR image is individually generated by each terminal apparatus 20 may be superimposed on a common AR image generated by the server apparatus 10.

Processing of Terminal Apparatus 20: Information Sending Side

Figure 10:
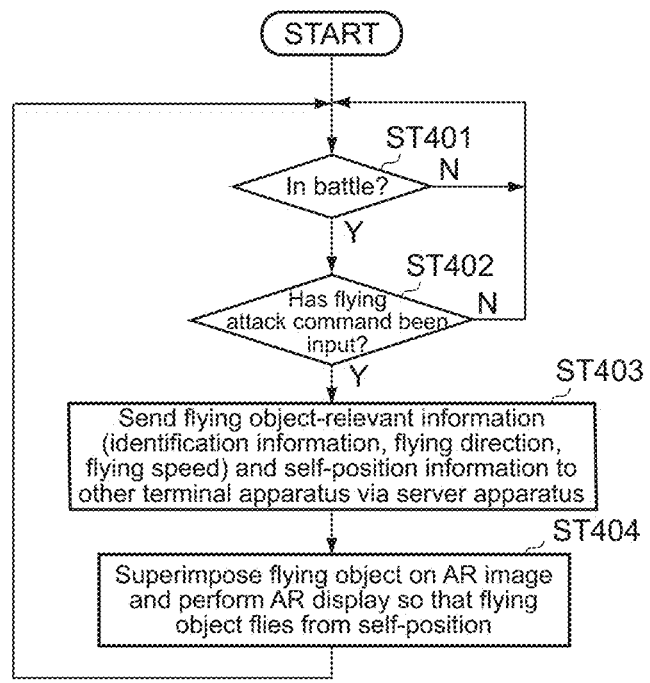
FIG. 10 A flowchart showing processing of the terminal apparatus on an information sending side.

Next, processing of the terminal apparatus 20 on the information sending side will be described. FIG. 10 is a flowchart showing processing of the terminal apparatus 20 on the information sending side.

First of all, the control unit 21 of the terminal apparatus 20 determines whether it is in battle with the enemy virtual object 5 (it is positioned within the grouping region 2) (Step 401) (see Steps 303 and 308). In a case where it is not in battle (NO in Step 401), the control unit 21 of the terminal apparatus 20 returns to Step 401 again.

On the other hand, in a case where it is in battle (YES in Step 401), the control unit 21 of the terminal apparatus 20 determines whether a flying attack command has been input from the user via the operation unit 27 (Step 402). In a case where the flying attack command has not been input (NO in Step 402), the control unit 21 of the terminal apparatus 20 returns to Step 401.

On the other hand, in a case where the flying attack command has been input (YES in Step 402), the control unit 21 of the terminal apparatus 20 shifts to next Step 403. In Step 403, the control unit 21 of the terminal apparatus 20 sends flying object-relevant information to the server apparatus 10 and causes the server apparatus 10 to send the flying object-relevant information and the self-position information to the other terminal apparatuses 20 belonging to the same group.

The flying object-relevant information includes identification information of the flying object (e.g., information for identifying which one, the magic, bullet, or arrow the flying object is), information about the flying direction of the flying object, and information about the flying speed of the flying object.

After the control unit 21 of the terminal apparatus 20 causes the server apparatus 10 to send the flying object-relevant information and the self-position information to the other terminal apparatuses 20 belonging to the same group, the control unit 21 of the terminal apparatus 20 shifts to next Step 404. In Step 404, the control unit 21 of the terminal apparatus 20 superimposes the flying object on the common AR image sent from the server apparatus 10 and performs AR display so that the flying object flies in the flying direction from the self-position (i.e., the point 1) at a speed depending on the flying speed. The kind of flying object is determined depending on the kind of flying attack command.

After that, the control unit 21 of the terminal apparatus 20 returns to Step 401. It should be noted that in the terminal apparatus 20 that has done the flying attack command, it looks like the flying object is flying in the flying direction from the self-position (i.e., from the point 1) as in FIG. 9.

Processing of Terminal Apparatus 20: Information Receiving Side

Figure 11:
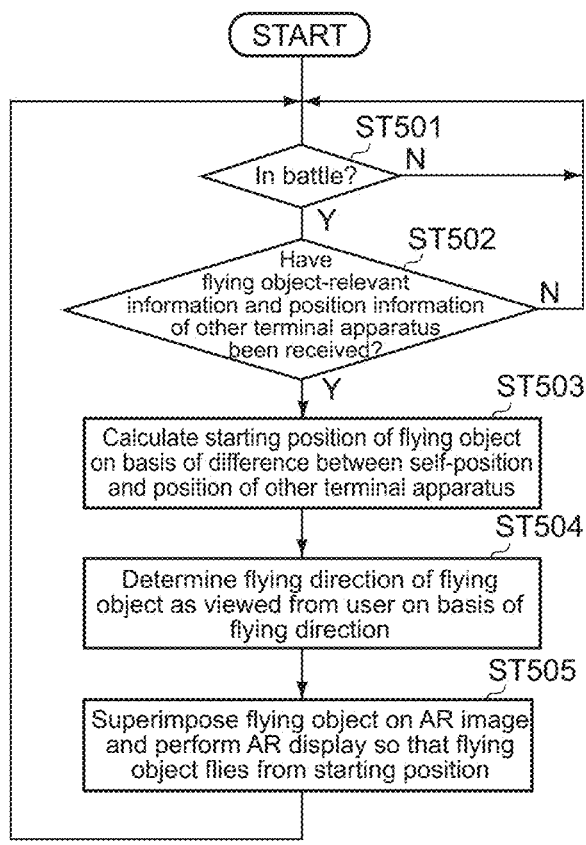
FIG. 11 A flowchart showing processing of the terminal apparatus on an information receiving side.
Figure 12:
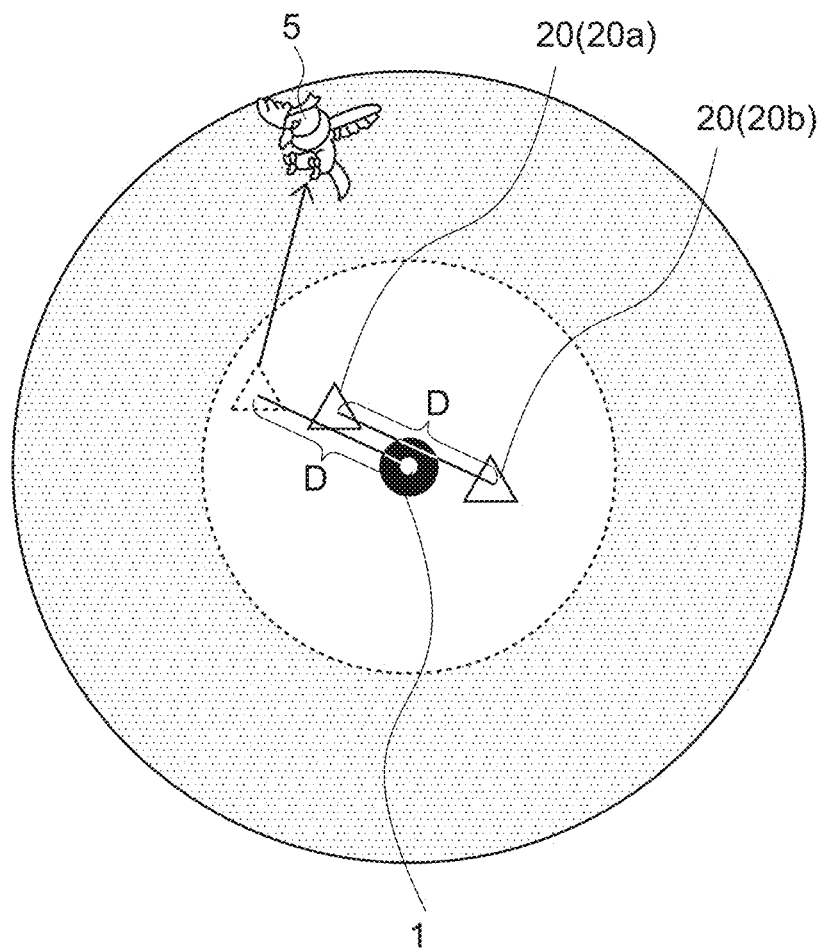
FIG. 12 A diagram showing how a flying object looks in the terminal apparatus on the information receiving side.
Figure 12:
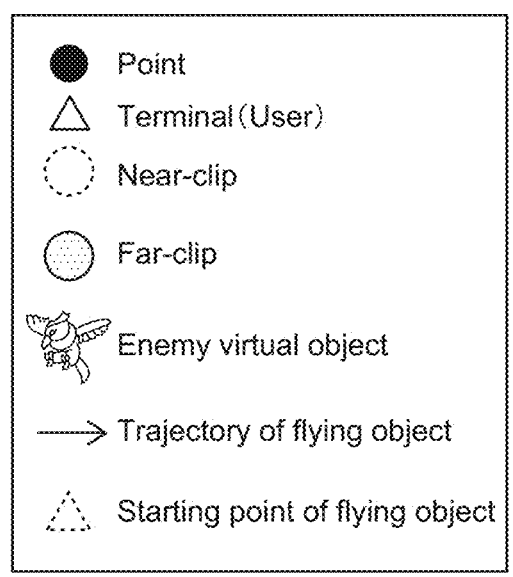

Next, processing of the terminal apparatus 20 on the information receiving side will be described. FIG. 11 is a flowchart showing the processing of the terminal apparatus 20 on the information receiving side. FIG. 12 is a diagram showing how the flying object looks in the terminal apparatus 20 on the information receiving side.

First of all, the control unit 21 of the terminal apparatus 20 determines whether it is in battle with the enemy virtual object 5 (whether it is positioned within the grouping region 2) (Step 501) (see Steps 303 and 308). In a case where it is not in battle (NO in Step 501), the control unit 21 of the terminal apparatus 20 returns to Step 501 again.

On the other hand, in a case where it is in battle (YES in Step 501), the control unit 21 of the terminal apparatus 20 shifts to next Step 502. In Step 502, the control unit 21 of the terminal apparatus 20 determines whether the flying object-relevant information and the position information of the other terminal apparatus 20 (the terminal apparatus 20 that has done the flying attack command) have been received from the server apparatus 10.

In a case where such information has not been received from the server apparatus 10 (NO in Step 502), the control unit 21 of the terminal apparatus 20 returns to Step 501. On the other hand, in a case where such information has been received from the server apparatus 10 (YES in Step 502), the control unit 21 of the terminal apparatus 20 shifts to next Step 503.

In Step 503, the control unit 21 of the terminal apparatus 20 calculates a difference D between the self-position and the position of the other terminal apparatus 20 (the terminal apparatus 20 that has done the flying attack command) in the global coordinate system and sets a starting point (AR display position) of the flying object on the basis of the calculated difference D.

FIG. 12 shows an example of the difference D between the self-position and the other terminal apparatus 20 and a position of a starting point of a flying command. In the description of FIG. 12, as in FIG. 9, the user and the terminal apparatus 20 positioned at the northwest (upper left) of the point 1 will be respectively referred to as the first user and the first terminal apparatus 20a for the sake of convenience and the user and the terminal apparatus 20 positioned at the east (right) of the point 1 will be respectively referred to as the second user and the second terminal apparatus 20b for the sake of convenience.

In a case where the first terminal apparatus 20a has done the flying attack command, the second terminal apparatus 20b calculates the difference D and the starting point. The second terminal apparatus 20b is not positioned at the point 1 but the second user perceives the enemy virtual object 5 as if the second user was watching the enemy virtual object 5 from the position of the point 1. On the other hand, when the first terminal apparatus 20a is seen from the position of the second terminal apparatus 20b in the real space, the first terminal apparatus 20a is positioned at the position of the difference D. Therefore, in this case, the starting point of the flying object is set at a position corresponding to the difference D from the position of the point 1.

After calculating the starting point, the control unit 21 of the terminal apparatus 20 calculates the flying direction of the flying object as viewed from the user on the basis of the information about the flying direction included in the received flying object-relevant information (Step 504) (see the arrow direction of FIG. 12).

Next, the control unit 21 of the terminal apparatus 20 superimposes the flying object on the common AR image sent from the server apparatus 10 and performs AR display so that the flying object flies in the flying direction from the position of the starting point at a speed depending on the flying speed (movement speed) (Step 505) (see the arrow of FIG. 12). The kind of flying object is determined depending on the identification information included in the received flying object relevant information.

It should be noted that in a case where the flying object hits the enemy virtual object 5, it appears to all the users that the flying object hits the enemy virtual object 5 at the same timing by adjustment of the flying speed of the flying object (movement speed). The adjustment of the flying speed can be realized by, for example, setting the time from the start of the attack of the flying object to the hit of the flying object to the enemy virtual object 5 to be a certain constant.

When the flying object hits the enemy virtual object 5, an effect indicating that the flying object hits the enemy object or a motion in which the enemy virtual object 5 is knocked down may be AR displayed. The effect or the knockdown motion in this case is typically realized by the common AR image generated by the server apparatus 10.

With the above-mentioned processing, in the present embodiment, the starting point of the flying object, the flying direction, the flying speed (hit timing to the enemy virtual object 5), and the like are natural for all the users included in the group with no discomfort.

AR Shielding

Next, AR shielding of the shielding object 6 against the enemy virtual object 5 will be described. Here, the shielding object 6 is a real object in the real space whose relative position from each terminal apparatus 20 is different for each of the positions of the respective terminal apparatuses 20 and is an object likely to shield the enemy virtual object 5 (first virtual object). The shielding object 6 is, for example, a building, wall, or the like in the real space.

In a case where the common AR image is used in each terminal apparatus 20, how the enemy virtual object 5 is shielded by the shielding object 6 will be described.

Figure 13:
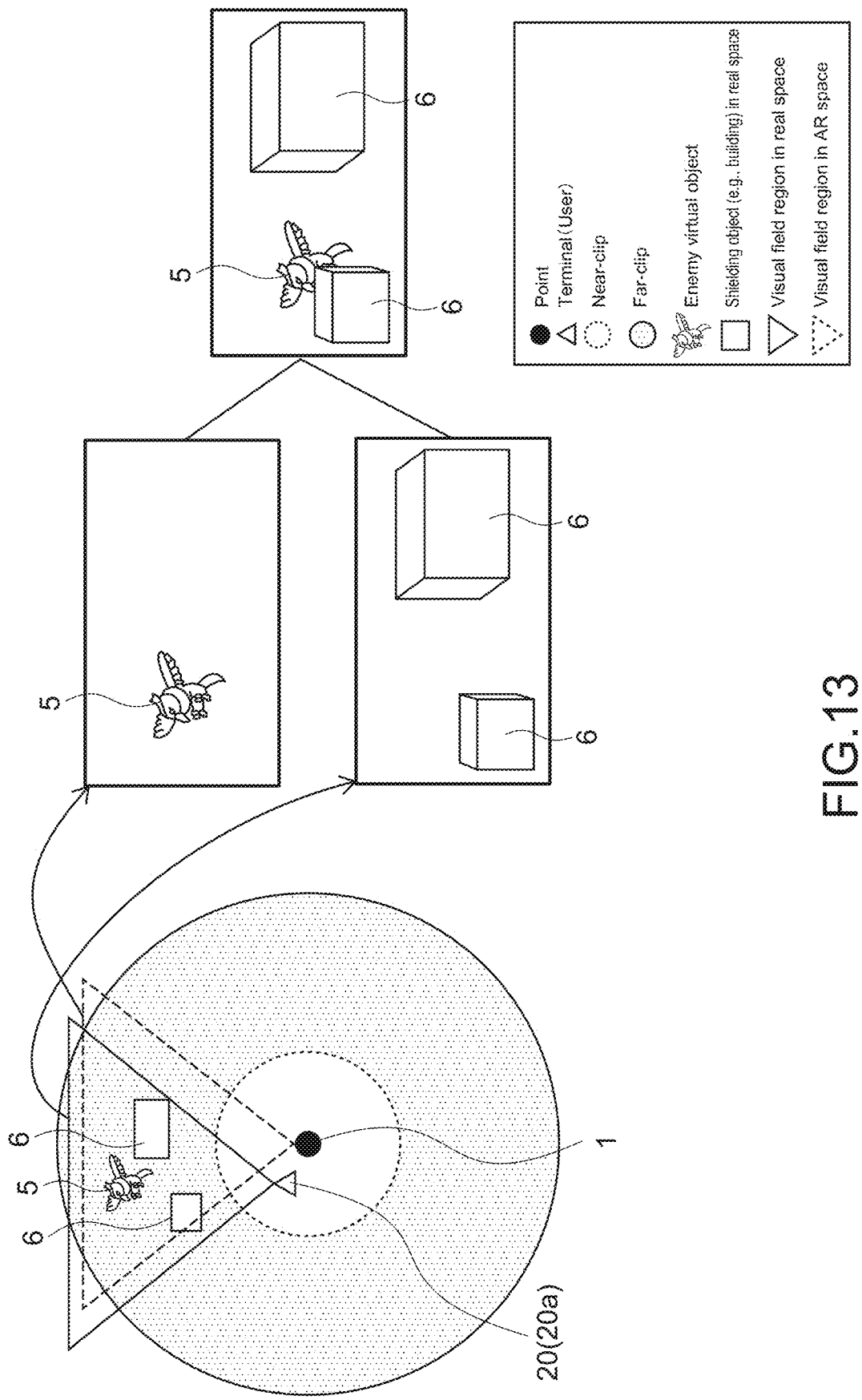
FIG. 13 A diagram showing how an enemy virtual object is shielded by a shielding object in a first user and a first terminal apparatus positioned at the northwest of a point.
Figure 14:
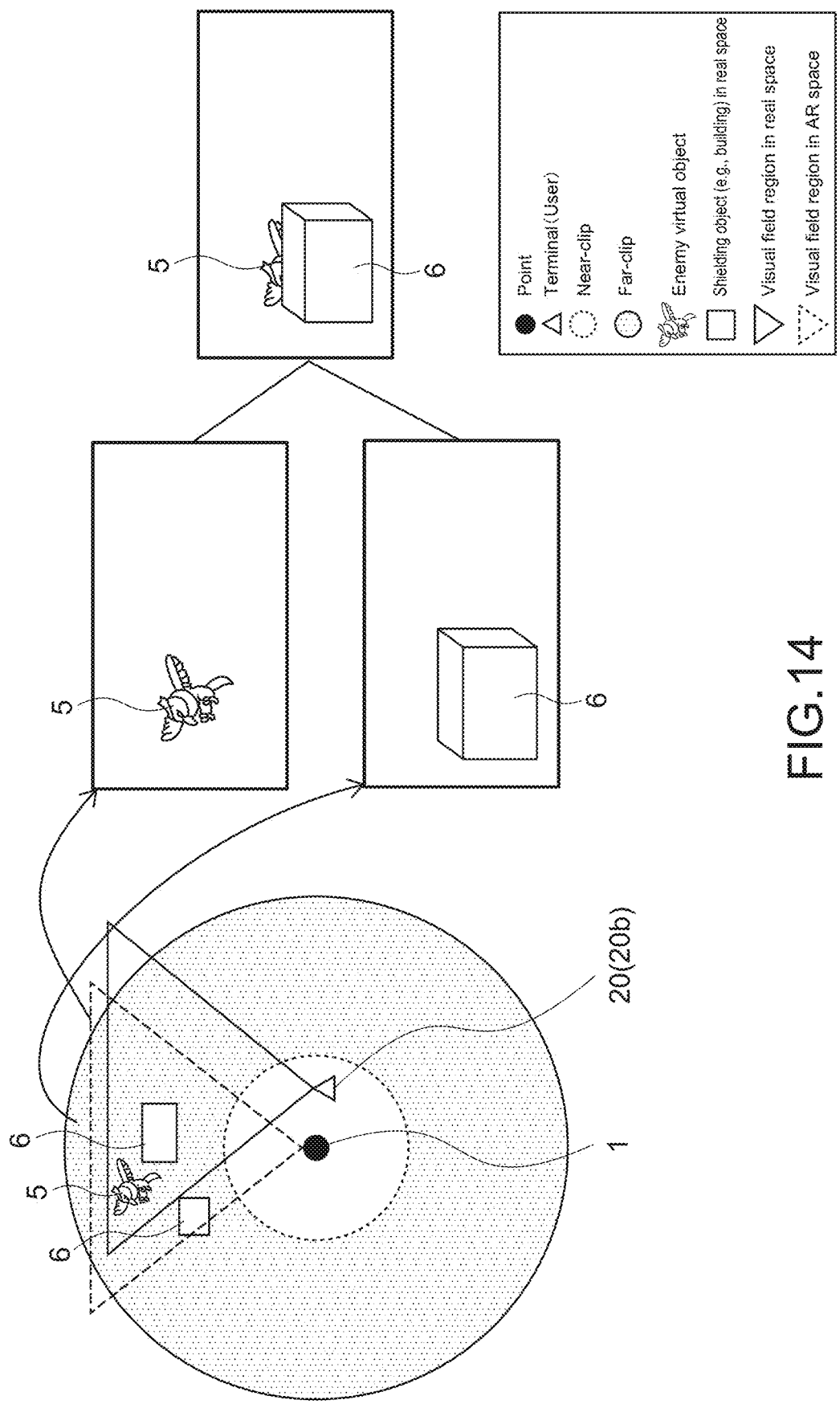
FIG. 14 A diagram showing how the enemy virtual object is shielded by the shielding object in a second user and a second terminal apparatus positioned at the east of the point.

FIG. 13 is a diagram showing how the enemy virtual object 5 is shielded by the shielding object 6 in the first user and the first terminal apparatus 20a positioned at the northwest of the point 1. FIG. 14 is a diagram showing how the enemy virtual object 5 is shielded by the shielding object 6 in the second user and the second terminal apparatus 20b positioned at the east of the point 1.

First of all, FIG. 13 will be described. As shown in FIG. 13, the first user (first terminal apparatus 20a) is positioned at the northwest (upper left) of the point 1. In the AR space, irrespective of the position of the first user in the real space, the first user perceives the enemy virtual object 5 as if the first user was watching the enemy virtual object 5 from the position of the point 1.

For example, the field of view of the first user in the AR space when the first user faces the north side is as shown in the dotted-line inverted triangle in FIG. 13. Therefore, as shown in the upper middle side of FIG. 13, it appears to the first user that the enemy virtual object 5 is positioned at the upper left position in the AR space.

On the other hand, positions and apparent shapes of the shielding objects 6 as viewed from the position of the first user in the real space change depending on the position of the first user in the real space. For example, the field of view of the first user in the real space when the first user faces the north side is as shown in the solid-line inverted triangle in FIG. 13. Therefore, as shown in the lower middle side of FIG. 13, the first user perceives a smaller shielding object 6 on the front left side in the real space and a larger shielding object 6 on the front right side.

Therefore, on the basis of a positional relationship between the enemy virtual object 5 in the AR space and the shielding objects 6 in the real space, the first user finally perceives the enemy virtual object 5 and the shielding objects 6 as shown on the right-hand side of FIG. 13. That is, when the first user views the enemy virtual object 5, the enemy virtual object 5 should be AR displayed so that the body and legs shielded by the shielding object 6 are partially missing.

Next, FIG. 14 will be described. As shown in FIG. 14, the second user (second terminal apparatus 20b) is positioned at the east (right) of the point 1. In the AR space, irrespective of the position of the second user in the real space, the second user perceives the enemy virtual object 5 as if the second user was watching the enemy virtual object 5 from the position of the point 1.

For example, the field of view of the second user in the AR space when the second user faces the north side is as shown in the dotted-line inverted triangle in FIG. 14. Therefore, as shown in the upper middle side of FIG. 14, it appears to the second user that the enemy virtual object 5 is positioned on the front left side in the AR space. What the enemy virtual object 5 looks like is common to the first user and the second user.

On the other hand, position and apparent shapes of the shielding objects 6 as viewed from the position of the second user in the real space change depending on the position of the second user in the real space. For example, the field of view of the second user in the real space when the second user faces the north side is as shown in the solid-line inverted triangle in FIG. 14. Therefore, as shown on the lower middle side of FIG. 14, the second user perceives the larger shielding object 6 on the front left side in the real space.

It should be noted that the smaller shielding object 6 is also included in the field of view as viewed from the first user while the smaller shielding object 6 is not included in the field of view as viewed from the second user.

On the basis of a positional relationship between the enemy virtual object 5 in the AR space and the shielding objects 6 in the real space, the second user finally perceives the enemy virtual object 5 and the shielding objects 6 as shown on the right-hand side of FIG. 14. That is, as the second user views the enemy virtual object 5, AR display should be performed so that a lower large portion of the enemy virtual object 5, which has been shielded by the shielding object 6, is missing.

As it can be seen from the comparison of the picture on the right-hand side of FIG. 13 with the picture on the right-hand side of FIG. 14, which portion of the enemy virtual object 5 is shielded by the shielding objects 6 depends on the position of each terminal apparatus 20 and is not common to the respective terminal apparatuses 20.

Also in such a situation, in the present embodiment, processing as follows is performed for correctly performing the AR shielding in each terminal apparatus 20.

For example, when the control unit 11 of the server apparatus 10 sends, in Step 104 of FIG. 5, information for AR display to each terminal apparatus 20, the control unit 11 of the server apparatus 10 sends three types of information as follows.

(1) RGB (Red Green Blue) information of enemy virtual object 5
(2) Depth information of enemy virtual object 5
(3) Depth information of shielding object 6 (shielding object information regarding shielding object 6)

Figure 15:
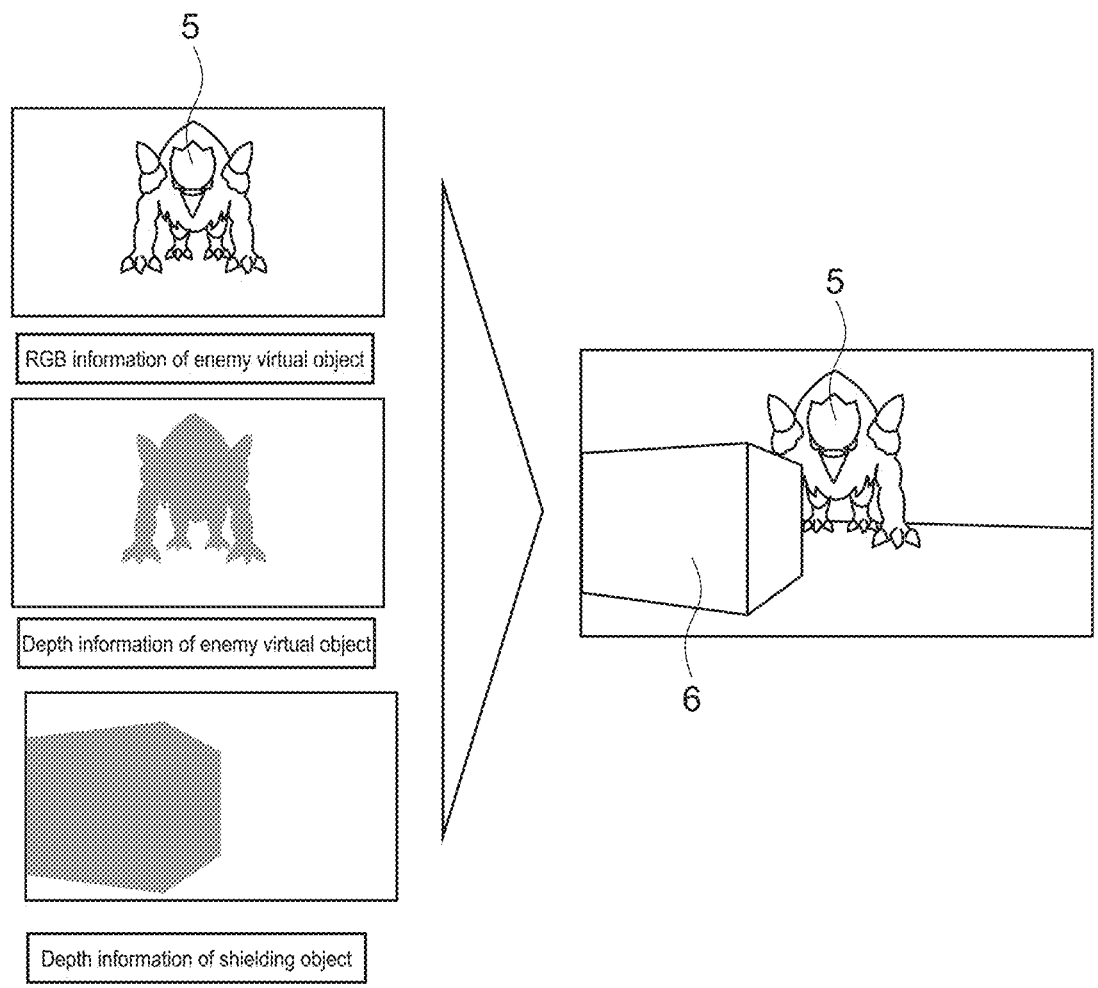
FIG. 15 A diagram showing RGB information of the enemy virtual object, depth information of the enemy virtual object, and depth information of the shielding object.

FIG. 15 is a diagram showing the RGB information of the enemy virtual object 5, the depth information of the enemy virtual object 5, and the depth information of the shielding object 6.

Here, the RGB information of the enemy virtual object 5 and the depth information of the enemy virtual object 5 are information common to the respective terminal apparatuses 20 belonging to the same group. On the other hand, the depth information of the shielding object 6 is individual information for each terminal apparatus 20.

That is, the control unit 11 of the server apparatus 10 individually generates depth information of the shielding object 6 for each terminal apparatus 20 and sends the depth information of the shielding object 6 to each terminal apparatus 20. The depth information of the shielding object 6 is generated by the control unit 11 of the server apparatus 10 on the basis of the position information of the terminal apparatus 20 and the position information and shape information of the shielding objects 6 stored in the shielding object database 30.

The control unit 21 of the terminal apparatus 20 performs the following processing after the control unit 21 of the terminal apparatus 20 receives the RGB information of the enemy virtual object 5, the depth information of the enemy virtual object 5, and the depth information of the shielding object 6 from the server apparatus 10.

First of all, the control unit 21 of the terminal apparatus 20 determines a positional relationship in the depth direction between the enemy virtual object 5 and the shielding object 6 on the basis of the depth information of the enemy virtual object 5 and the depth information of the shielding object 6. Next, in a case where the enemy virtual object 5 is positioned on a deeper side than the shielding object 6, the control unit 21 of the terminal apparatus 20 removes a portion of the RGB information of the enemy virtual object 5, which is positioned on a deeper side than the shielding object 6. Then, the control unit 21 of the terminal apparatus 20 performs AR display for a portion of the RGB information of the enemy virtual object 5, which is not shielded by the shielding object 6.

On the right-hand side of FIG. 15, a state when the portion of the RGB information of the enemy virtual object 5, which is shielded by the shielding object 6, is removed and the portion of the RGB information of the enemy virtual object 5, which is not shielded by the shielding object 6, is AR displayed is shown.

With the processing as described above, also in the present technology in which the AR image common to the respective terminal apparatuses 20 is used, it becomes possible to correctly perform the AR shielding.

Actions, Etc

As described above, in the present embodiment, the server apparatus 10 groups, on the basis of the respective position information of the respective terminal apparatuses 20, the terminal apparatuses 20 that are present within the grouping region 2 and generates and sends the common AR image to the terminal apparatuses 20 included in the group.

Accordingly, in the present embodiment, it is unnecessary for the server apparatus 10 to individually generate AR images for each terminal apparatus 20, and it is sufficient to generate an AR image for each grouping region 2. Therefore, the processing load on the server apparatus 10 in the cloud rendering can be appropriately reduced.

Moreover, in the present embodiment, each terminal apparatus 20 individually generates an AR image of the flying object (second virtual object) and superimposes the AR image of the flying object (second virtual object) on the common AR image.

Accordingly, in the present embodiment, it becomes possible to naturally present the position and motion of the flying object to each of the users included in the group.

Moreover, in the present embodiment, the server apparatus 10 individually generates depth information of the shielding object 6 for each terminal apparatus 20. Then, on the basis of the depth information of the shielding object 6, the terminal apparatus 20 performs AR display of the portion of the enemy virtual object 5, which is not shielded by the shielding object 6.

Accordingly, also in the present technology in which the AR image common to the respective terminal apparatuses 20 is used, it becomes possible to correctly perform the AR shielding.

Various Modified Examples

Hereinabove, the case where the present technology is applied to the game has been described. On the other hand, the present technology can also be used for applications other than the game. Typically, the present technology can also be used for any application as long as it is various events or the like where a plurality of human beings gather in a certain region.

The present technology can also take the following configurations.

(1) A server apparatus, including
a control unit that groups, on the basis of position information of terminal apparatuses capable of performing augmented reality (AR) display, terminal apparatuses that are present within a predetermined region and generates and sends a common AR image to the terminal apparatuses included in a group.

(2) The server apparatus according to (1), in which
the control unit groups the terminal apparatuses that are present within a region at a first distance from a predetermined point.

(3) The server apparatus according to (2), in which
the common AR image is an image having an angle wider than an AR display angle in the terminal apparatus.

(4) The server apparatus according to (3), in which
the common AR image is a 360-degree image having a center at the point.

(5) The server apparatus according to any one of (2) to (4), in which
the common AR image is an image within a region at a second distance or more and a third distance or less from the point.

(6) The server apparatus according to (5), in which
the second distance is equal to or greater than the first distance.

(7) The server apparatus according to any one of (1) to (6), in which
the common AR image includes a first virtual object, and
each of the terminal apparatuses individually generates an AR image of a second virtual object at a relative AR display position from each terminal apparatus, which is different for each of positions of the terminal apparatuses, and superimposes the AR image of the second virtual object on the common AR image.

(8) The server apparatus according to (7), in which
the terminal apparatus acquires position information of another terminal apparatus and sets the AR display position of the second virtual object on the basis of self-position information and position information of the other terminal apparatus.

(9) The server apparatus according to (8), in which
the second virtual object is a movable object, and
the terminal apparatus adjusts a movement speed of the second virtual object.

(10) The server apparatus according to any one of (1) to (9), in which
the common AR image includes a first virtual object, and
the control unit individually generates, for each terminal apparatus, shielding object information regarding a shielding object likely to shield the first virtual object and sends the shielding object information to each terminal apparatus, the shielding object being a real object in a real space and being at a relative position from each terminal apparatus that is different for each of positions of the terminal apparatuses.

(11) The server apparatus according to (10), in which
the control unit generates the shielding object information on the basis of position information of the terminal apparatus and position information of the shielding object.

(12) The server apparatus according to (10) or (11), in which
the terminal apparatus performs the AR display for a portion of the first virtual object, which is not shielded by the shielding object, on the basis of the shielding object information.

(13) A terminal apparatus, including
a control unit that receives, from a server apparatus that groups, on the basis of position information of terminal apparatuses capable of performing augmented reality (AR) display, terminal apparatuses that are present within a predetermined region and generates and sends a common AR image to the terminal apparatuses included in a group, the common AR image and performs AR display on the basis of the common AR image.

(14) An information processing system, including:
a server apparatus that groups, on the basis of position information of terminal apparatuses capable of performing augmented reality (AR) display, terminal apparatuses that are present within a predetermined region and generates and sends a common AR image to the terminal apparatuses included in a group; and
a terminal apparatus that receives the common AR image and performs AR display on the basis of the common AR image.

(15) An information processing method, including
grouping terminal apparatuses that are present within a predetermined region on the basis of position information of the terminal apparatuses capable of performing augmented reality (AR) display and generating and sending a common AR image to the terminal apparatuses included in a group.

REFERENCE SIGNS LIST 1 point
2 grouping region
5 enemy virtual object
6 shielding object
10 server apparatus
20 terminal apparatus
30 shielding object database

The invention claimed is:

1. A server apparatus, comprising
circuitry configured to group, on a basis of position information of terminal apparatuses capable of performing augmented reality (AR) display, terminal apparatuses that are present within a predetermined region and generate and send a common AR image to the terminal apparatuses included in a group, wherein
the common AR image includes a first virtual object, and
each of the terminal apparatuses individually generates an AR image of a second virtual object at a relative AR display position from each terminal apparatus, which is different for each of positions of the terminal apparatuses, and superimposes the AR image of the second virtual object on the common AR image.

2. The server apparatus according to claim 1, wherein
the circuitry groups the terminal apparatuses that are present within a region at a first distance from a predetermined point.

3. The server apparatus according to claim 2, wherein
the common AR image is an image having an angle wider than an AR display angle in the terminal apparatus.

4. The server apparatus according to claim 3, wherein
the common AR image is a 360-degree image having a center at the point.

5. The server apparatus according to claim 2, wherein
the common AR image is an image within a region at a second distance or more and a third distance or less from the point.

6. The server apparatus according to claim 5, wherein
the second distance is equal to or greater than the first distance.

7. The server apparatus according to claim 1, wherein
the terminal apparatus acquires position information of another terminal apparatus and sets the AR display position of the second virtual object on a basis of self-position information and position information of the other terminal apparatus.

8. The server apparatus according to claim 7, wherein
the second virtual object is a movable object, and
the terminal apparatus adjusts a movement speed of the second virtual object.

9. A server apparatus, comprising
circuitry configured to group, on a basis of position information of terminal apparatuses capable of performing augmented reality (AR) display, terminal apparatuses that are present within a predetermined region and generate and send a common AR image to the terminal apparatuses included in a group, wherein
the common AR image includes a first virtual object, and
the circuitry individually generates, for each terminal apparatus, shielding object information regarding a shielding object likely to shield the first virtual object and sends the shielding object information to each terminal apparatus, the shielding object being a real object in a real space and being at a relative position from each terminal apparatus that is different for each of positions of the terminal apparatuses.

10. The server apparatus according to claim 9, wherein
the circuitry generates the shielding object information on a basis of position information of the terminal apparatus and position information of the shielding object.

11. The server apparatus according to claim 9, wherein
the terminal apparatus performs the AR display for a portion of the first virtual object, which is not shielded by the shielding object, on a basis of the shielding object information.

12. A terminal apparatus, comprising
circuitry configured to receive, from a server apparatus that groups, on a basis of position information of terminal apparatuses capable of performing augmented reality (AR) display, terminal apparatuses that are present within a predetermined region and generate and send a common AR image to the terminal apparatuses included in a group, the common AR image and performs AR display on a basis of the common AR image, wherein
the common AR image includes a first virtual object, and
each of the terminal apparatuses individually generates an AR image of a second virtual object at a relative AR display position from each terminal apparatus, which is different for each of positions of the terminal apparatuses, and superimposes the AR image of the second virtual object on the common AR image.

13. An information processing system, comprising:
a server apparatus that groups, on a basis of position information of terminal apparatuses capable of performing augmented reality (AR) display, terminal apparatuses that are present within a predetermined region and generates and sends a common AR image to the terminal apparatuses included in a group; and
a terminal apparatus that receives the common AR image and performs AR display on a basis of the common AR image, wherein
the common AR image includes a first virtual object, and
each of the terminal apparatuses individually generates an AR image of a second virtual object at a relative AR display position from each terminal apparatus, which is different for each of positions of the terminal apparatuses, and superimposes the AR image of the second virtual object on the common AR image.

14. An information processing method, comprising
grouping terminal apparatuses that are present within a predetermined region on a basis of position information of the terminal apparatuses capable of performing augmented reality (AR) display and generating and sending a common AR image to the terminal apparatuses included in a group, wherein
the common AR image includes a first virtual object, and
each of the terminal apparatuses individually generates an AR image of a second virtual object at a relative AR display position from each terminal apparatus, which is different for each of positions of the terminal apparatuses, and superimposes the AR image of the second virtual object on the common AR image.

* * * * *